United States Patent [19]
Croce

[11] Patent Number: 5,116,233
[45] Date of Patent: May 26, 1992

[54] ELECTRIC CONTACT HOLDER BASE

[75] Inventor: Claudio Croce, Caselette, Italy
[73] Assignee: Imos Italia S.r.l., Turin, Italy
[21] Appl. No.: 637,167
[22] Filed: Jan. 3, 1991
[30] Foreign Application Priority Data
  Jan. 12, 1990 [IT] Italy .................. 52812 8/90
[51] Int. Cl.⁵ .......................................... H01R 13/20
[52] U.S. Cl. ........................................ 439/161; 219/264
[58] Field of Search ............... 439/161, 668, 669; 219/262, 263, 264, 265

[56] References Cited
U.S. PATENT DOCUMENTS

| | | | |
|---|---|---|---|
| 2,224,034 | 12/1940 | Lehmann | 219/265 |
| 2,248,402 | 7/1941 | Conboy | 219/265 |
| 2,258,989 | 10/1941 | Liner | 439/161 |
| 3,012,120 | 12/1961 | Gaudet | 219/265 |
| 3,424,414 | 1/1969 | Horwitt | 219/265 |
| 4,650,962 | 3/1987 | Pramaggiore | 219/264 |

Primary Examiner—Larry I. Schwartz
Assistant Examiner—Hien D. Vu
Attorney, Agent, or Firm—Bachman & LaPointe

[57] ABSTRACT

An electric contact holder base for electric lighters or other gadgets for motor vehicles is provided with a thermic protection against overheating that allows its reutilization. The base has a substantially cylindrical body, permanently fixed in the passenger's cabin and carries electric contacts for the gadget that is inserted in said cylindrical body. At least a bimetallic spring acts as a holding element of the lighter in the cylindrical body during the resting phase of the same. A bimetallic lamina is the thermic protection device against overheating; this is a separated element, connected at one end with an electric contact, while the other end is facing the wall of the cylindrical body and folded back towards its bottom.

3 Claims, 1 Drawing Sheet $t_A > t_B$ $d_A > d_B$

ELECTRIC CONTACT HOLDER BASE

BACKGROUND OF THE INVENTION

This invention relates to an electric contact holder base for electric lighters and for other motor vehicle gadgets, provided with a thermic protection against overheating so as to allow it to be re-utilized.

Usually in electric contact holder bases for gadgets such as lighters, the thermic protection is realized by an element of plastic material that melts in case of accidental overheating and causes the fuse to burn for short circuit. In this way, possible damage to the walls surrounding the gadget are avoided, but the case cannot be repaired, so that it necessarily has to be completely substituted.

In order to avoid having the operation of the thermic protection cause the need to substitute the whole electric holder base, other solutions propose the use of a bimetallic lamina acting as a thermic protection. This lamina is however obtained as a whole with the same springs that in the base have the function of retaining the body of a lighter or as a polarity for other gadgets; consequently, a great waste of material takes place in obtaining this substantially T shaped piece out of a bimetallic strip.

Furthermore, in said solutions, the bimetallic portion which is meant to realize the thermic protection is fitted in the inside of the base, in such a way that they are subject to accidental damage. This happens because the protection is folded back against the gadget that is inserted into the base.

Therefore, it is enough to give the gadget a slightly greater pressure than the usual in order to deform the lamina; consequently, its operation is altered or compromised. So as to avoid this eventuality, the bottom of the base is provided with an element of insulating material that raises its expense.

A purpose of this invention is to propose an electric contact holder base having a thermic protection made of a bimetallic lamina cheaper than the ones that are actually used, and in which the bimetallic lamina is located inside the base so as not to be subject to accidental crashes and deformations.

Another purpose of this invention is to propose a bimetallic lamina showing a substantially linear relation between deflection and temperature for the entire range of temperatures at which the device has to work. This prevents the temperature from reaching excessively high values inside the base and, at the same time, it allows one to obtain the base that is the object of the present invention with a simple structural arrangement, avoiding therefore working with very low tolerances when assembling the device.

SUMMARY OF THE INVENTION

For these and other purposes that will be better understood hereinbelow, this invention proposes to obtain an electric contact holder base for electric lighters or other gadgets for motor vehicles, provided with a thermic protection against overheating that allows its reutilization, of the kind consisting of a substantially cylindrical body permanently fixed to a seat in the driver's cabin and carrying the electric contacts for the gadget that is inserted in said cylindrical body; at least a bimetallic spring acting as a holding element of the lighter in the cylindrical body during the resting phase of the same; a bimetallic lamina being the thermic protection device against overheating; characterized in that the metallic lamina is a separate element connected at one end with an electric contact while the other end is facing the wall of the cylindrical body and folded back towards its bottom.

BRIEF DESCRIPTION OF THE DRAWINGS

The object of this invention will be described below referring to the enclosed drawings, in which.

DETAILED DESCRIPTION

Figure 1:
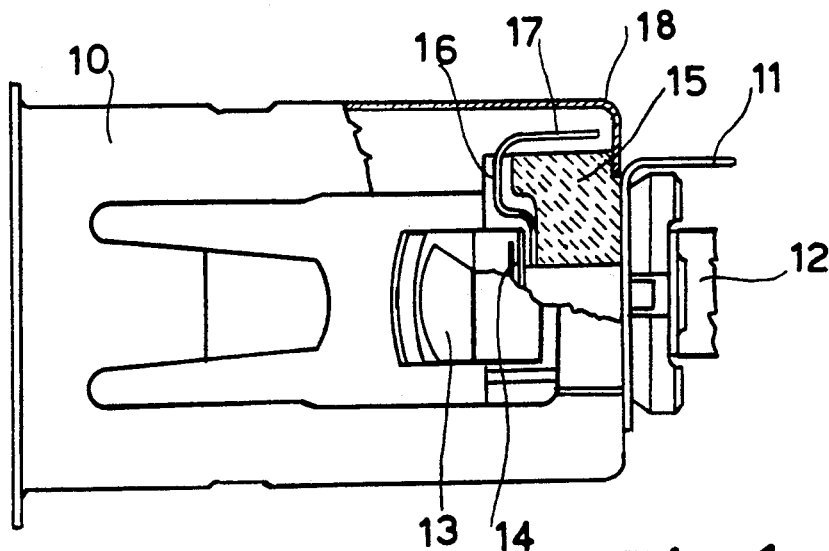
FIG. 1 shows an electric contact holder base for a motor vehicle, partially sectioned and provided with the thermic protection according to this invention.

The base 10 is usually a hollow cylindrical body having an open end for inserting a lighter or another suitable gadget; the other end of the base is closed by an end plate 18 carrying electric contacts 11 and 12.

Contact 11 is electrically connected with the body 10 while contact 12 is connected with traditional springs 13 that act as holding means or as a polarity for other gadgets.

A ceramic element 15 is interposed between the head of a rivet 14 and contact 11. Rivet 14 is electrically connected with contact 12. The head of the rivet 14 acts as a binding element for the lamina 16 to be described below.

According to this invention, between the head of the rivet 14 and the ceramic body 15, a bimetallic lamina 16 is inserted with a free end 17 and folded back towards the bottom 18 of the body 10, between the side wall and the ceramic body 15.

In case of an excessive overheating of the electric hot plate of the lighter or of the gadget, the bimetallic lamina 16 bends and its end 17 contacts the wall of the base 10 short-circuiting the device in this way and causing the burnout of a protecting fuse.

Once the cause of overheating has been removed and the fuse replaced, the base 10 will be able to resume its own normal operation, because in the meantime the bimetallic lamina 16 will have returned automatically to its original position and no other component of the base or of the gadget will have suffered alterations or damages so as to compromise the correct operation thereof.

Experimentally it can be observed that the thermic deformation of bimetals tends to assume a considerably non-linear increase in function of the temperature rise.

This means that, over a certain threshold, an additional temperature increase will not cause any considerable dilatation in the heated bimetal.

In the case of the lamina 16 it is necessary that such bimetallic lamina should produce a substantially linear temperature-deflection diagram for the entire range of the temperatures that are used.

This is necessary because, in case of an excessive overheating of the lighter's hot plate, the free end 17 of the lamina 16 must be able to touch the wall of the base 10 quite quickly. The purpose is to avoid having the temperature rise too much in order to have the lamina reach the deflection that causes the short-circuit.

It can be observed that in a resting position (FIG. 1) the free end 17 is at a certain distance from the wall of the base 10. Otherwise, a bimetallic lamina with non linear characteristics would require one to position the end 17 of the lamina 16 at a minimum distance from the wall to allow the short circuit to take place at the prescribed temperatures. In such case it would be also necessary to work with very low tolerances, inevitabily raising the manufacturing costs.

Figure 2:
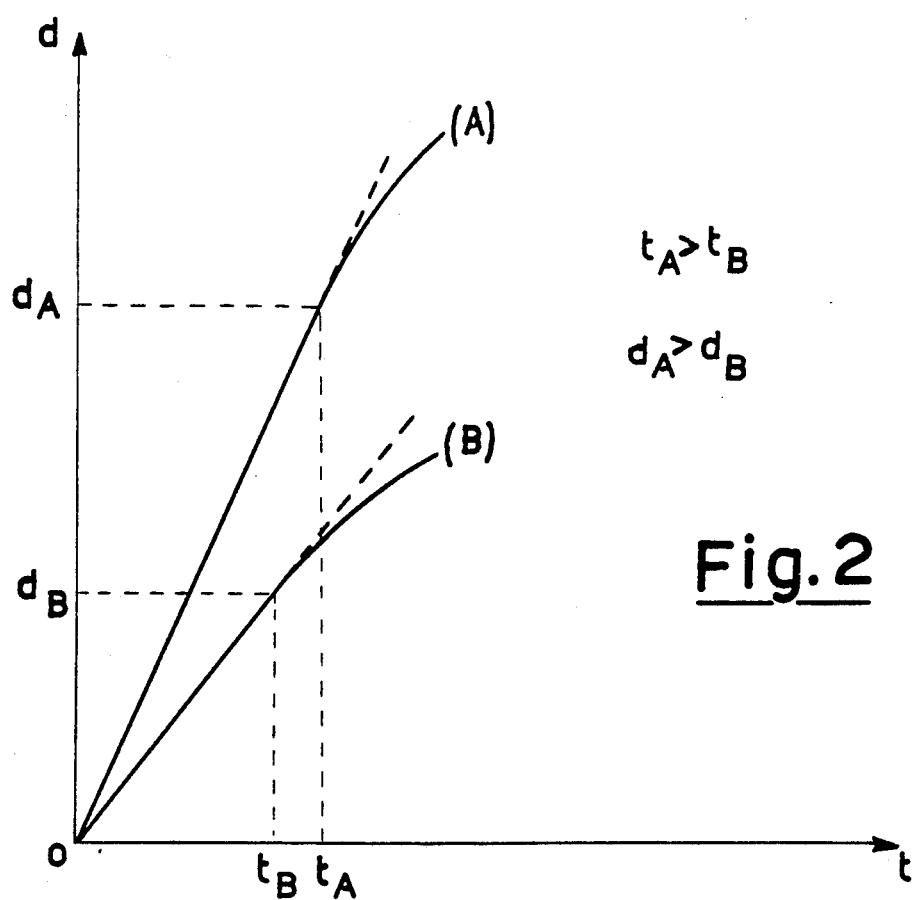
FIG. 2 shows two temperature-deflection diagrams that are typical of materials that are used for some parts of the invention.

Referring to FIG. 2 a qualitative temperature-deflection diagram with substantially linear characteristics is marked with (A). This diagram represents a bimetallic lamina 16 meant to short-circuit the device that is the object of the present invention.

Temperatures have been reported on the abscissa line, while the corresponding deflections of the lamina 16 have been reported on the ordinate line.

As to spring 13, the foregoing question is submitted in absolutely different terms: the purpose of the spring 13 is in fact that of releasing the heating element of the lighter once the ideal temperature level is reached.

The heating element, not shown in the drawings, is in turn submitted to the returning force of a helical spring: consequently the bimetallic spring 13 has no need to exhibit a linear behavior within the same range of temperatures as the bimetallic lamina 16.

Considering the different functions of the bimetallic lamina 16 and of the bimetallic spring 13, this invention allows one to choose the most suitable kind of materials for each one of them.

For example, in FIG. 2 the "temperature-deflection" graph of a bimetallic spring 13 is marked with (B); said spring has different characteristics and a linear course within a smaller range of temperatures and deformations compared to the graph (A) of the lamina that is suitable for the bimetallic lamina 16.

After these previous considerations, one of the purposes of this invention can be understood: as shown in FIG. 1, the lamina 16 is a simple strip of bimetallic material separated from the spring 13 and assembled separately from it, as the two springs 13 and 16 are made of not necessarily identical bimetallic materials; on the contrary, the materials are advantageously different and have different characteristics.

Moreover, the lamina 16 is folded back so as not to be crashed and deformed by the gadget that is inserted inside the base or by other objects that could be accidently or intentionally be slipped inside the base.

I claim:

1. An electric contact holder base for electric lighters or gadgets for motor vehicles, provided with a thermic protection against overheating that allows its reutilization, which comprises: a substantially cylindrical body having a bottom and a wall portion permanently fixed to the interior of a motor vehicle and carrying electric contacts for an item that is inserted in said cylindrical body; a bimetallic spring acting as a holding element in the cylindrical body during the resting phase of the same; a bimetallic lamina inside the base as the thermic protection device against overheating; wherein the bimetallic lamina is a separate element connected at one end with one of said electric contacts while the other end is a free end facing the wall of the cylindrical body and folded back towards said bottom, and wherein said free end contacts said wall portion to cause a short circuit on overheating with a substantially linear course of deflection as a function of temperature, wherein the bimetallic lamina and the bimetallic spring are made of materials having different characteristics with regard to the respective deflections as a function of the temperature, and wherein the bimetallic lamina maintains a substantially linear course of the deflection as a function of the temperatures greater in comparison with the bimetallic spring.

2. A base according to claim 1 wherein the bimetallic lamina is pinched between the head of a rivet and wherein said rivet is electrically connected to one of said electric contacts.

3. A base according to claim 2 wherein the free end of the bimetallic lamina is contained between the wall of the cylindrical body and an insulating ceramic element.

* * * * *